US011537466B2

(12) United States Patent
Ionin et al.

(10) Patent No.: US 11,537,466 B2
(45) Date of Patent: Dec. 27, 2022

(54) DETECTION OF DATA DISCREPANCY AFTER XOR RECOVERY

(71) Applicant: Western Digital Technologies, Inc., San Jose, CA (US)

(72) Inventors: Michael Ionin, Rehovot (IL); Alexander Bazarsky, Holon (IL)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 17/241,846

(22) Filed: Apr. 27, 2021

(65) Prior Publication Data

US 2022/0342752 A1  Oct. 27, 2022

(51) Int. Cl.
*G06F 11/10* (2006.01)
*G06F 11/07* (2006.01)
*G06F 3/06* (2006.01)
*G06F 11/30* (2006.01)

(52) U.S. Cl.
CPC ......... *G06F 11/1068* (2013.01); *G06F 3/064* (2013.01); *G06F 3/0619* (2013.01); *G06F 3/0623* (2013.01); *G06F 3/0679* (2013.01); *G06F 11/076* (2013.01); *G06F 11/0772* (2013.01); *G06F 11/3037* (2013.01)

(58) Field of Classification Search
CPC .............. G06F 11/1068; G06F 11/076; G06F 11/0772; G06F 3/0619; G06F 3/0623; G06F 3/064; G06F 3/0679
See application file for complete search history.

(56) References Cited

U.S. PATENT DOCUMENTS

| | | | |
|---|---|---|---|
| 6,574,774 B1 | 6/2003 | Vasiliev | |
| 8,006,126 B2 | 8/2011 | Deenadhayalan et al. | |
| 8,397,107 B1 | 3/2013 | Syu et al. | |
| 8,671,250 B2 | 3/2014 | Lee | |
| 10,679,718 B2 | 6/2020 | Ghaly et al. | |
| 2016/0092300 A1* | 3/2016 | Lei | G06F 11/1068 714/764 |
| 2017/0194989 A1* | 7/2017 | Kumar | H03M 13/29 |

* cited by examiner

*Primary Examiner* — Shelly A Chase
(74) *Attorney, Agent, or Firm* — Patterson & Sheridan, LLP; Steven H. VerSteeg

(57) ABSTRACT

A data storage device includes a memory device and a controller coupled to the memory device. The controller comprises an XOR module, an ECC module, a scrambler, an encoder, and comparison logic. The controller is configured to retrieve data from the memory device, decode the retrieved data, execute XOR protection logic on the decoded data, encode the decoded data, and compare the encoded data to the retrieved data stored in the memory device.

20 Claims, 4 Drawing Sheets

DETECTION OF DATA DISCREPANCY AFTER XOR RECOVERY

BACKGROUND OF THE DISCLOSURE

Field of the Disclosure

Embodiments of the present disclosure generally relate to data storage devices, such as solid state drives (SSDs), and techniques for ensuring that requested data is transferred to a host device.

Description of the Related Art

In data storage systems, a mis-compare event occurs when a host device requests data from a data storage device corresponding to logical block address (LBA) X and receives data corresponding to a different LBA, such as LBA Y, or outdated data from LBA X without any indication from the data storage device. The data storage device includes reliability measures to avoid decoding failures due to a high bit error rate (BER). The reliability measures include an exclusive OR (XOR) system that generates and stores XOR signatures along with the data in a memory device of the data storage device.

If the data has accumulated an unacceptable amount of bit errors, the data storage device may use the stored XOR signature associated with the data to recover the data. However, during the recovery, data integrity may be lost due to problems in the recovery implementation or due to external intervention. Due to a loss in data integrity, a mis-compare event may occur. For example, a request to read an upper page may result in returning data of a lower page, where the controller sends the data of the lower page back to the host device without detecting that the wrong data has been retrieved.

Thus, there is a need in the art for an improved post-XOR recovery data integrity check.

SUMMARY OF THE DISCLOSURE

The present disclosure generally relates to data storage devices, such as solid state drives (SSDs), and techniques for ensuring that requested data is transferred to a host device. A data storage device includes a memory device and a controller coupled to the memory device. The controller comprises an XOR module, an ECC module, a scrambler, an encoder, and comparison logic. The controller is configured to retrieve data from the memory device, decode the retrieved data, execute XOR protection logic on the decoded data, encode the decoded data, and compare the encoded data to the retrieved data stored in the memory device.

In one embodiment, a data storage device includes a memory device and a controller coupled to the memory device. The controller is configured to retrieve data from the memory device, decode the retrieved data, execute XOR protection logic on the decoded data, encode the decoded data, compare the encoded data to the data stored in the memory device, and execute additional XOR protection logic on the decoded data. The additional XOR protection logic is different from the XOR protection logic.

In another embodiment, a data storage device includes a memory device and a controller coupled to the memory device. The controller includes an error correction code (ECC) module configured to decode data retrieved from the memory device, an exclusive or (XOR) module coupled to the ECC module, a scrambler coupled to the XOR module, an encoder coupled the scrambler, and comparison logic coupled to the encoder. Thee comparison logic is configured to compare an encoded data to the retrieved data. The comparison has a maximum difference threshold between the encoded data and the retrieved data. Upon determining that the maximum difference threshold is exceeded, the controller is configured to execute additional XOR protection logic on the decoded data. The additional XOR protection logic is different from the XOR protection logic.

In another embodiment, a data storage device includes means for storing data, means for decoding data retrieved from the means for storing data, means for recovering uncorrectable decoded data, means for encoding recovered decoded data, means for comparing encoded data with the data retrieved from the means for storing data, and means for, upon determining that the maximum threshold is exceeded, executing additional means for recovering uncorrectable decoded data, wherein the additional means for recovering uncorrectable decoded data is different from the means for recovering uncorrectable decoded data. The means for comparing comprises determining that a difference between the encoded data and the retrieved data is less than or equal to a maximum threshold.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure generally relates to data storage devices, such as solid state drives (SSDs), and techniques for ensuring that requested data is transferred to a host device. A data storage device includes a memory device and a controller coupled to the memory device. The controller comprises an XOR module, an ECC module, a scrambler, an encoder, and comparison logic. The controller is configured to retrieve data from the memory device, decode the retrieved data, execute XOR protection logic on the decoded data, encode the decoded data, and compare the encoded data to the retrieved data stored in the memory device.

Figure 1:
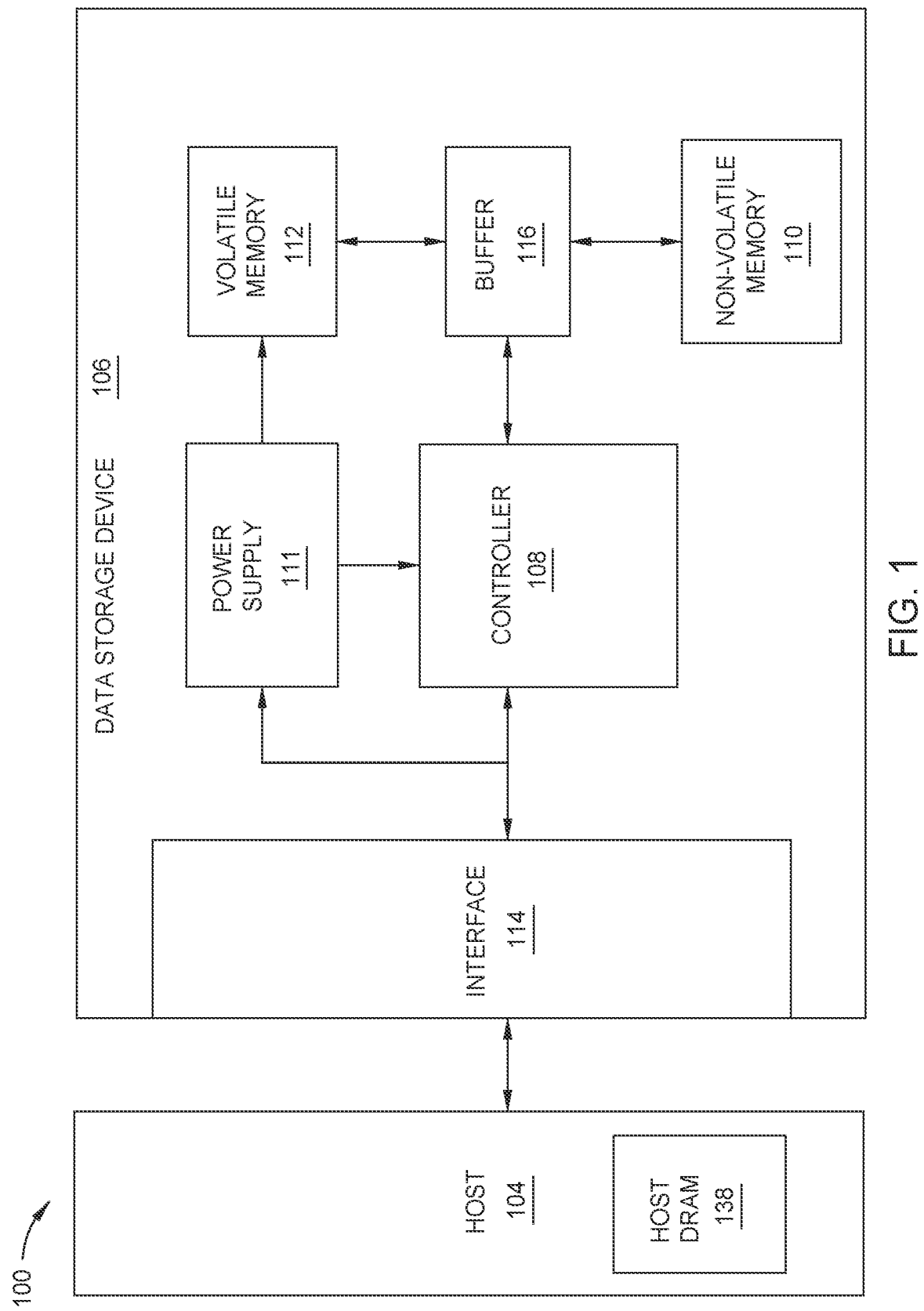
FIG. 1 depicts a schematic block diagram illustrating a storage system in which a data storage device may function as a storage device for a host device, according to certain embodiments.

FIG. 1 depicts a schematic block diagram illustrating a storage system 100 in which data storage device 106 may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The data storage device 106 includes a controller 108, NVM 110, a power supply 111, volatile memory 112, an interface 114, and a write buffer 116. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106, or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe x1, x4, x8, x16, PCIe Mini Card, MiniPCI, etc.). In some examples, the data storage device 106 may be directly coupled (e.g., directly soldered) to a motherboard of the host device 104.

The interface 114 of the data storage device 106 may include one or both of a data bus for exchanging data with the host device 104 and a control bus for exchanging commands with the host device 104. The interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. The electrical connection of the interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of the interface 114 may also permit the data storage device 106 to receive power from the host device 104. For example, as illustrated in FIG. 1, the power supply 111 may receive power from the host device 104 via the interface 114.

The NVM 110 may include a plurality of memory devices or memory units. NVM 110 may be configured to store and/or retrieve data. For instance, a memory unit of NVM 110 may receive data and a message from the controller 108 that instructs the memory unit to store the data. Similarly, the memory unit of NVM 110 may receive a message from the controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit of NVM 110 may include any type of non-volatile memory devices, such as flash memory devices, phase-change memory (PCM) devices, resistive random-access memory (ReRAM) devices, magnetoresistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR based flash memory devices and may store data based on a charge contained in a floating gate of a transistor for each flash memory cell. In NVM flash memory devices, the flash memory device may be divided into a plurality of dies, where each die of the plurality of dies includes a plurality of blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The data storage device 106 includes a power supply 111, which may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via the interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, supercapacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The data storage device 106 also includes volatile memory 112, which may be used by controller 108 to store information. Volatile memory 112 may include one or more volatile memory devices. In some examples, the controller 108 may use volatile memory 112 as a cache. For instance, the controller 108 may store cached information in volatile memory 112 until cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)).

The data storage device 106 includes a controller 108, which may manage one or more operations of the data storage device 106. For instance, the controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. The controller 108 may determine at least one operational characteristic of the storage system 100 and store the at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

Figure 2:
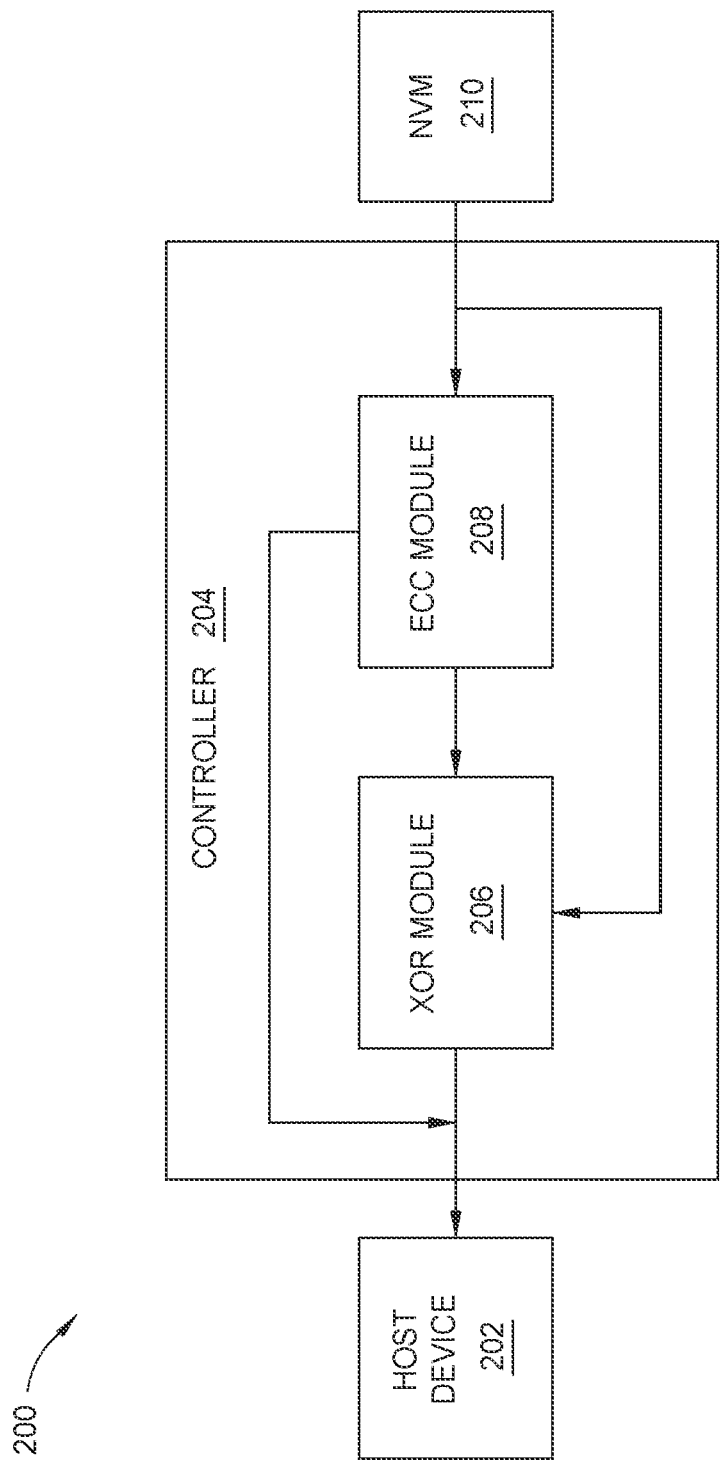
FIG. 2 depicts a schematic block diagram illustrating an XOR recovery of data retrieved by a controller from a memory device, according to certain embodiments.

FIG. 2 depicts a schematic block diagram 200 illustrating an XOR recovery of data retrieved by a controller 204 from a memory device (i.e., NVM 210), according to certain embodiments. Aspects of FIG. 2 may be similar to the aspects of the storage system 100 of FIG. 1. For example, a host device 202 may be the host device 104, a controller 204 may be the controller 108, and the NVM 210 may be the NVM 110.

The controller 204 includes an XOR module 206 and an error correction code (ECC) module 208. The controller 204 may receive a read command from the host device 202 to retrieve data, such as a flash memory unit (FMU), from the NVM 210. An FMU is a minimal addressable logical unit of memory that may be addressed. For example, the FMU may have a size of about 4,096 bytes. The data stored in the NVM 210 may be protected, such that bit errors and data corruption may be mitigated or repaired. Data protection may include, but is not limited to, ECC encoding of the data and generating XOR/parity data for the data programmed to the NVM 210. The relevant FMU is stored as encoded data in the NVM 210. When the read command is received by the controller 204 from the host device 202, the controller 204 retrieves the relevant FMU from the NVM 210.

The relevant FMU is transferred to the ECC module 208, where the ECC module 208 is configured to decode the relevant FMU. In some embodiments, the ECC module 208 may be a low-density parity-check (LDPC) module. If the decoding of the relevant FMU succeeds, such as due to a low or an acceptable BER, the relevant FMU is transferred to the host 202. However, if the decoding of the relevant FMU fails, such as due to a high or an unacceptable BER, the relevant FMU is passed to the XOR module 206.

The XOR module 206 utilizes an XOR signature associated with the relevant FMU as well as each decoded XORed codeword of the XOR stripe (excluding the failed codeword (i.e., the codeword including the relevant FMU)) to recover the relevant data. The XOR signature and each decoded XORed codeword of the XOR stripe are XORed in order to recover the relevant data. If the XOR recovery operation is successful, then the recovered FMU should theoretically be identical to the relevant FMU that had a decoding failure at the ECC module 208. The recovered FMU is then sent to the host 202.

In some embodiments, a host LBA is stored within a header of the FMU. When the host LBA is stored within the header of the FMU, the requested host LBA is compared to the LBA stored in the header of the FMU. Thus, the controller 204 may be able to determine whether the requested host LBA matches the LBA stored in the header of the FMU. However, if the controller 204 determines that the requested host LBA matches the LBA stored in the header of the FMU, the controller 204 may not be able to determine whether the FMU includes relevant data or has been overwritten by the host device 202, such that the data of the FMU corresponds to old LBA data.

Figure 3:
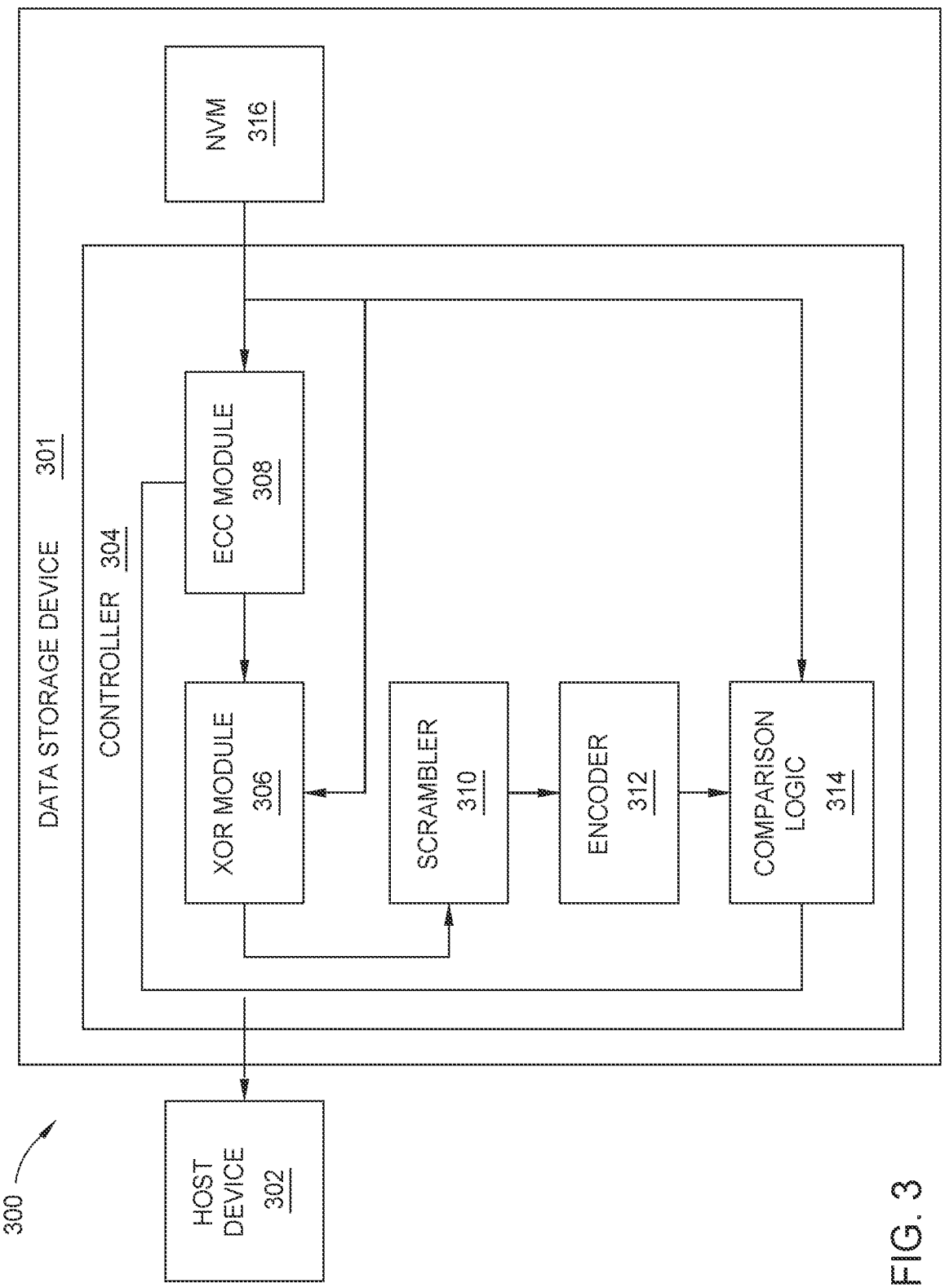
FIG. 3 depicts a schematic block diagram illustrating an improved XOR recovery of data retrieved by a controller from a memory device, according to certain embodiments.

FIG. 3 depicts a schematic block diagram of a storage system 300 illustrating an improved XOR recovery of data retrieved by a controller 304 from a memory device (i.e., NVM 316), according to certain embodiments. Aspects of FIG. 3 may be similar to the described aspects of FIG. 2 and/or FIG. 1. For example, a host device 302 may be the host device 202, a controller 304 may be the controller 204, the NVM 316 may be the NVM 210, and a storage device 301 may be the storage device 106. The data storage device 301 comprises the controller 304 and the NVM 316. The controller 304 includes an XOR module 306, which may be the XOR module 206, an ECC module 308, which may be the ECC module 208, a scrambler 310, an encoder 312, and a comparison logic module 314.

Rather than sending the recovered FMU directly to the host device 302 without confirming that the recovered FMU matches the relevant FMU stored in the NVM 316, the recovered FMU is transferred to the scrambler 310. By not sending the recovered FMU directly to the host device 302, the controller 304 may be able to determine whether the recovered FMU matches the relevant FMU stored in the NVM 316. When data is stored in the NVM 316, the data may be scrambled in order to spread the memory cells equally across the states of the memory cell. A seed is used for scrambling and may be stored with the encoded data in the NVM 316. The seed may include relevant information regarding the scrambling, such as how the data is scrambled. The seed is necessary for descrambling. When the data recovered at the XOR module 306, the descrambling of the data occurs for each of the successfully decoded codewords included in the XOR signature.

It is to be understood that while XOR recovery is exemplified, other methods of recovering data due to an unacceptable BER, data corruption, or the like are contemplated.

The recovered FMU and the seed are provided to the scrambler 310, where the scrambler 310 scrambles the recovered FMU utilizing the seed. The scrambled FMU is passed to the encoder 312, where the scrambled FMU is encoded. After encoding the scrambled FMU, the encoded FMU, which is clean of errors, is passed to the comparison logic module 314, where the encoded FMU is compared to the relevant FMU retrieved from the NVM 316.

Upon comparing the encoded FMU to the relevant FMU, the controller 304 may determine a percent difference between the encoded FMU and the relevant FMU, and whether the percent difference is above a maximum percent difference threshold. In one embodiment, the maximum percent difference threshold is about 5%, where the encoded FMU and the relevant FMU have a similarity of about 95% or greater and a difference of about 5% or less. It is to be understood that the minimum percent difference is greater than about 0%, but in some embodiments may be equal to about 0%. The minimum percent difference of greater than about 0% is determined due to requiring XOR recovery on the relevant FMU. The maximum percent difference threshold may be dependent on external conditions endured by the data storage device 301, or predetermined specifications of the data storage device 301.

In one embodiment, the maximum percent difference threshold may be static, such that the maximum percent difference threshold is constant during the operations of the data storage device 301. In another embodiment, the maximum percent difference threshold may be dynamic, such that the maximum percent difference threshold changes during the operations of the data storage device 301. For example, the dynamic threshold may be affected by various conditions such as a BER level and a strong cross temperature between write temperature and read temperature. It is to be understood that other conditions that affect the dynamic threshold are contemplated and are not limited by the examples provided above.

If the compared encoded FMU and the relevant FMU have a difference greater than the maximum percent difference threshold, then the controller 304 may either execute additional recovery operations on the relevant FMU and/or the encoded FMU or return a failed message to the host device 302 indicating that data recovery is not possible due to an uncorrectable error correction code (UECC). However, if the compared encoded FMU and the relevant FMU have a difference less than or equal to the maximum percent difference threshold, then the controller 304 may return the relevant FMU to the host device 302 in response to the read command. Thus, the controller 304 may confirm that relevant FMU corresponds to the correct LBA and not a different LBA or an old version of the data corresponding to the requested LBA.

The relevant FMU sensed from the NVM 316 for the requested LBA may be stored in the controller 304, such as in DRAM (not shown) of the controller 304, during the XOR recovery process. Alternatively, the relevant FMU may be read again from the NVM 316 after the XOR recovery is successful.

It is to be understood that the embodiments described above and herein are not intended to be limiting and other embodiments are contemplated. For example, rather than receiving a read command from the host device 302, the controller 304 may generate a data management operation command. For example, the data management operation command may be correspond to a garbage collection operation, data relocation operation due to a bad block, and the like.

Figure 4:
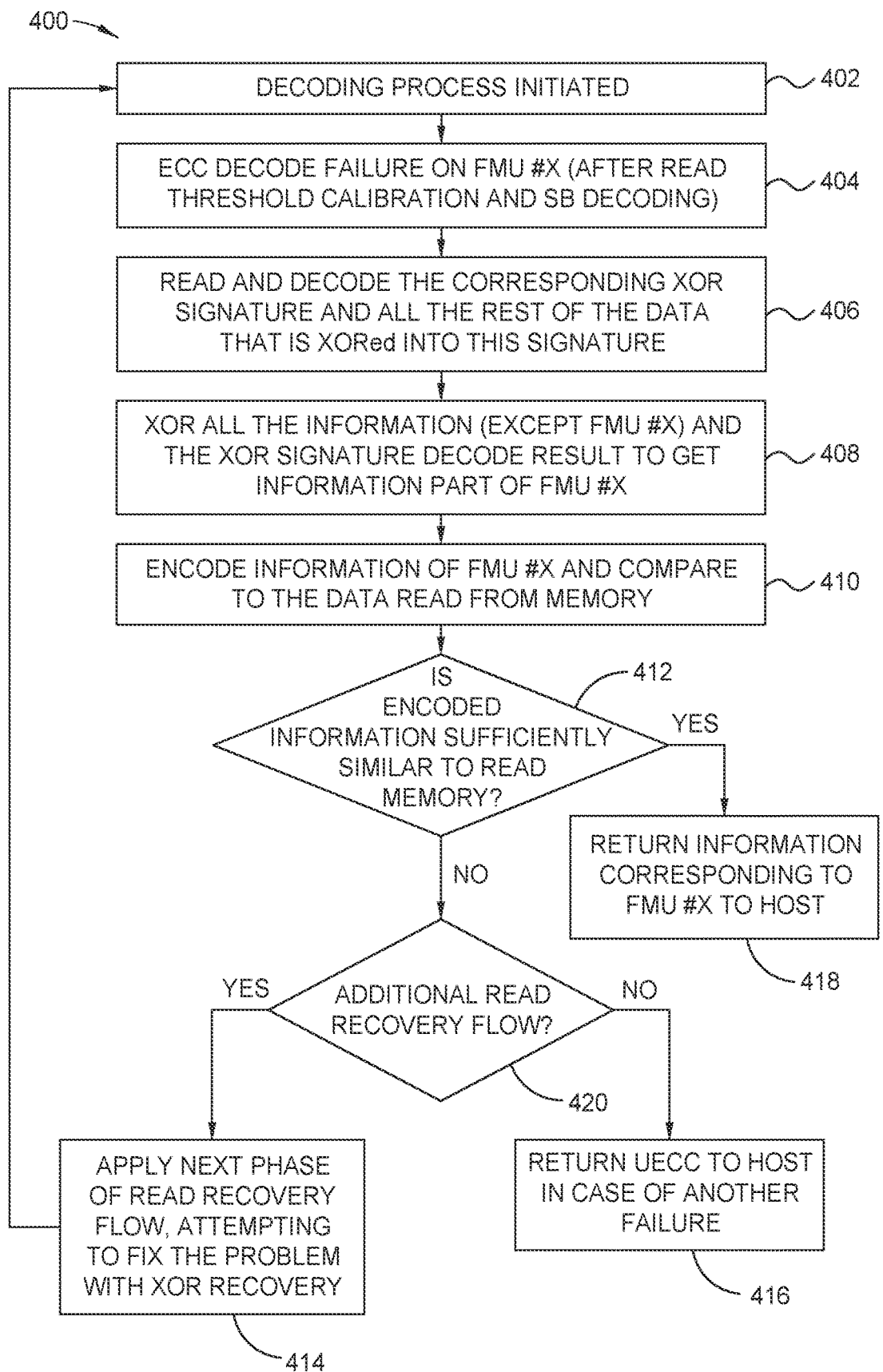
FIG. 4 depicts a flowchart illustrating a method of improved XOR recovery of data, according to certain embodiments.

FIG. 4 depicts a flowchart illustrating a method 400 of improved XOR recovery of data, according to certain embodiments. The method 400 may include references to the storage system 300 of FIG. 3 for exemplary purposes. At block 402, after a read command is received by the controller 304 of the storage device 301 from the host device 302, the relevant FMU associated with the read command (e.g., FMU #X) is retrieved from the host 302 and the decoding process is initiated. At block 404, the ECC module 308 has an ECC decode failure on the relevant FMU #X. The ECC decode failure may be detected after a read threshold calibration and soft bit (SB) decode.

At block 406, the failed relevant FMU #X is transferred to the XOR module 306, where the corresponding XOR signature, including the rest of the data that is XORed into the XOR signature, is read and decoded. In some examples, the XOR signature is stored with the corresponding data. In another example, the XOR signature is stored in a host memory buffer (HMB) (not shown) of the host 302. In yet another example, the XOR signature is stored with the corresponding data and a copy of the XOR signature is stored in the HMB. At block 408, the data, excluding the failed relevant FMU #X, is XORed with the decoded XOR signature to generate a recovered FMU #X, where the recovered FMU #X is the recovered version or portion of the failed relevant FMU #X. At block 410, the recovered FMU #X, including the seed utilized when scrambling the data of the FMU #X for storage in the NVM 316, is encoded by the encoder 312 and compared to the data read from the NVM 316 using the comparison logic module 314. At block 412, the controller 304 determines if the encoded FMU is sufficiently similar to the data read from the NVM 316.

If the encoded FMU #X is sufficiently similar to the data read from the NVM 316 at block 412, then the data is corresponding to the relevant FMU #X is returned to the host device 302 at block 418. The phrase "sufficiently similar" may refer to the maximum percent difference threshold described above. For example, if the encoded FMU #X and the data read from the NVM 316 have a difference of about 5% or less, then the data corresponding to the relevant FMU #X is returned to the host device 302 at block 418.

However, if the encoded FMU #X is not sufficiently similar to the data read from the NVM 316 at block 412, then the controller 304 determines if additional read recovery flows can be applied at block 420. For example, data may be protected by one or more read recovery flows by utilizing various types of XOR or parity data. An additional read recovery flow can be applied in instances where one or more read recovery flows (e.g., the data being protected by various types of XOR or parity data) have not yet been exhausted or attempted. The additional data recovery operations may be different than the XOR operation at blocks 406 and 408. For example, the additional data recovery operations may include at least one of a wordline-wordline XOR recovery operation, a plane-plane XOR recovery operation, string-string XOR recovery operation, and the like.

The additional read recovery flow is then applied, such as additional XOR recovery operations and the like, to the encoded FMU #X at block 414. For example, if the encoded FMU #X and the data read from the NVM 316 have a percentage difference greater than about 5%, then the controller 304 executes additional data recovery operations on the relevant FMU #X. After applying the additional read recovery flow at block 414, the method 400 returns to block 402 using the XOR or parity data of the additional read recovery operations. As such, the method 400 may be repeated one or more times using the various types of XOR or parity data until the relevant FMU #X is returned to the host device 302 at block 418 or until no more additional read recovery flows are available. If there are no more additional read recovery flows, such that all additional read recovery flows has been exhausted or the controller 304 determines that no more read recovery flows may be applied, then at block 416, an UECC is returned to the host device 302 after detecting that the additional read recovery flows failed.

By encoding the recovered data and comparing the encoded data to the corresponding data stored in the memory device, potential data mis-compare events may be avoided and data reliability may be improved. Furthermore, additional data recovery operations may be executed to ensure requested data is accurate or correct.

In one embodiment, a data storage device includes a memory device and a controller coupled to the memory device. The controller is configured to retrieve data from the memory device, decode the retrieved data, execute XOR protection logic on the decoded data, encode the decoded data, compare the encoded data to the data stored in the memory device, and execute additional XOR protection logic on the decoded data. The additional XOR protection logic is different from the XOR protection logic.

Executing the XOR protection logic is in response to a failed decoding of the retrieved data. The executing the additional XOR protection logic is in response to the encoded data being greater than a threshold percentage different than the retrieved data. A seed is retrieved from the retrieved data. The seed is provided to a scrambler disposed in the controller. The scrambler is configured to scramble the decoded data and store the seed with the decoded data. The encoded data includes the seed. The comparing comprises determining a percent difference between the encoded data and the data stored in the memory device. The controller is configured to determine whether the percent difference is greater than a threshold. The controller is configured to, when the percent difference is greater than the threshold, execute XOR recovery on the encoded data. The controller is configured to, when the percent difference is equal to or less than the threshold, provide the retrieved data to a host device. The threshold percent difference is about 5%. The controller is further configured to determine that the retrieved data corresponds to a different LBA data or outdated data. The decoding and the executing occurs after determining that the retrieved data corresponds to the different LBA data or the outdated data.

In another embodiment, a data storage device includes a memory device and a controller coupled to the memory device. The controller includes an error correction code (ECC) module configured to decode data retrieved from the memory device, an exclusive or (XOR) module coupled to the ECC module, a scrambler coupled to the XOR module, an encoder coupled the scrambler, and comparison logic coupled to the encoder. The comparison logic is configured to compare an encoded data to the retrieved data. The comparison has a maximum difference threshold between the encoded data and the retrieved data. Upon determining that the maximum difference threshold is exceeded, the controller is configured to execute additional XOR protection logic on the decoded data. The additional XOR protection logic is different from the XOR protection logic.

The controller is further configured to determine that the ECC module has failed decoding the retrieved data. The controller is configured to, after determining that the ECC module has failed decoding the retrieved data, utilize the XOR module to execute an XOR recovery on the retrieved data. The controller is further configured to return an uncorrectable error correction code indication to a host device upon determining that the XOR recovery has failed. The retrieved data is stored in an internal memory of the controller during the XOR recovery. The retrieved data is not stored in an internal memory of the controller during the XOR recovery. The controller is configured to re-retrieve the retrieved data from the memory device after completing the XOR recovery. The encoder encodes data scrambled by the scrambler. The data scrambled by the scrambler includes a seed. The controller is further configured to determine that a difference between the encoded data and the retrieved data is less than or equal to the maximum difference threshold and provide the encoded data, upon determining that the difference is less than or equal to the maximum difference threshold, to a host device.

In another embodiment, a data storage device includes means for storing data, means for decoding data retrieved from the means for storing data, means for recovering uncorrectable decoded data, means for encoding recovered decoded data, means for comparing encoded data with the data retrieved from the means for storing data, and means for, upon determining that the maximum threshold is exceeded, executing additional means for recovering uncorrectable decoded data, wherein the additional means for recovering uncorrectable decoded data is different from the means for recovering uncorrectable decoded data. The means for comparing comprises determining that a difference between the encoded data and the retrieved data is less than or equal to a maximum threshold.

The data storage device further includes means for returning an uncorrectable error correction code indication to a host device upon determining that the means for recovering uncorrectable decoded data and the additional means for recovering uncorrectable decoded data have failed. The data storage device further includes means for providing the data retrieved from the memory means upon determining that the difference is less than or equal to the maximum threshold.

While the foregoing is directed to embodiments of the present disclosure, other and further embodiments of the disclosure may be devised without departing from the basic scope thereof, and the scope thereof is determined by the claims that follow.

What is claimed is:

1. A data storage device, comprising:
   a memory device; and
   a controller coupled to the memory device, the controller configured to:
   retrieve data from the memory device;
   decode the retrieved data;
   execute XOR protection logic on the decoded data;
   encode the decoded data;
   compare the encoded data to the retrieved data stored in the memory device; and
   execute additional XOR protection logic on the decoded data, wherein the additional XOR protection logic is different from the XOR protection logic.

2. The data storage device of claim 1, wherein executing the XOR protection logic is in response to a failed decoding of the retrieved data, and wherein executing the additional XOR protection logic is in response to the encoded data being greater than a threshold percentage difference than the retrieved data.

3. The data storage device of claim 2, wherein a seed is retrieved from the retrieved data, and wherein the seed is provided to a scrambler disposed in the controller.

4. The data storage device of claim 3, wherein the scrambler is configured to scramble the decoded data and store the seed with the decoded data.

5. The data storage device of claim 4, wherein the encoded data includes the seed.

6. The data storage device of claim 1, wherein the comparing comprises determining a percent difference between the encoded data and the data stored in the memory device, and wherein the controller is configured to determine whether the percent difference is greater than a threshold percent difference.

7. The data storage device of claim 6, wherein the controller is configured to, when the percent difference is greater than the threshold, execute XOR recovery on the encoded data.

8. The data storage device of claim 6, wherein the controller is further configured to, when the percent difference is equal to or less than the threshold percent difference, provide the retrieved data to a host device.

9. The data storage device of claim 6, wherein the threshold percent difference is about 5%.

10. The data storage device of claim 1, wherein the controller is further configured to determine that the retrieved data corresponds to a different LBA data or outdated data, and wherein the decoding and the executing occurs after determining that the retrieved data corresponds to the different LBA data or the outdated data.

11. A data storage device, comprising:
a memory device; and
a controller coupled to the memory device, the controller comprising:
an error correction code (ECC) module configured to decode data retrieved from the memory device;
an exclusive or (XOR) module coupled to the ECC module;
a scrambler coupled to the XOR module;
an encoder coupled the scrambler; and
comparison logic coupled to the encoder, wherein the comparison logic is configured to compare an encoded data to the retrieved data, and wherein the comparison has a maximum difference threshold between the encoded data and the retrieved data,
wherein upon determining that the maximum difference threshold is exceeded, the controller is configured to execute additional XOR protection logic on the decoded data, wherein the additional XOR protection logic is different from the XOR protection logic.

12. The data storage device of claim 11, wherein the controller is further configured to determine that the ECC module has failed decoding the retrieved data.

13. The data storage device of claim 12, wherein the controller is further configured to, after determining that the ECC module has failed decoding the retrieved data, utilize the XOR module to execute an XOR recovery on the retrieved data.

14. The data storage device of claim 13, wherein the controller is further configured to return an uncorrectable error correction code indication to a host device upon determining that the XOR recovery has failed.

15. The data storage device of claim 13, wherein the retrieved data is stored in an internal memory of the controller during the XOR recovery.

16. The data storage device of claim 13, wherein the retrieved data is stored outside the controller during the XOR recovery, and wherein the controller is further configured to re-retrieve the retrieved data from the memory device after completing the XOR recovery.

17. The data storage device of claim 11, wherein:
the encoder encodes data scrambled by the scrambler;
the data scrambled by the scrambler includes a seed; and
the controller is further configured to:
determine that a difference between the encoded data and the retrieved data is less than or equal to the maximum difference threshold; and
provide the encoded data, upon determining that the difference is less than or equal to the maximum difference threshold, to a host device.

18. A data storage device, comprising:
means for storing data;
means for decoding data retrieved from the means for storing data;
means for recovering uncorrectable decoded data;
means for encoding recovered decoded data;
means for comparing encoded data with the data retrieved from the means for storing data, wherein the means for comparing comprises determining that a difference between the encoded data and the retrieved data is less than or equal to a maximum threshold; and
means for executing additional recovering of uncorrectable decoded data upon determining that the maximum threshold is exceeded, wherein the additional recovering of uncorrectable decoded data is different from the recovering of uncorrectable decoded data.

19. The data storage device of claim 18, further comprising means for returning an uncorrectable error correction code indication to a host device upon determining that the means for recovering uncorrectable decoded data and the additional recovering of uncorrectable decoded data have failed.

20. The data storage device of claim 18, further comprising means for providing the data retrieved from the means for storing data upon determining that the difference is less than or equal to the maximum threshold.

* * * * *